Jan. 9, 1934.   P. W. BEGGS   1,942,913
DIFFERENTIAL GOVERNOR
Filed Feb. 16, 1931   6 Sheets-Sheet 1

Witness:
William P. Kilroy

Inventor:
Paul W. Beggs
By Hill & Hill Attys

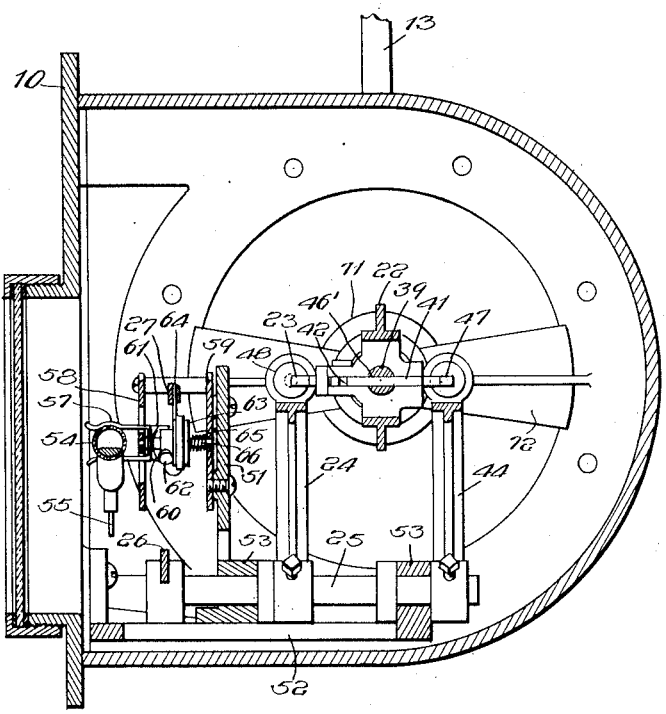
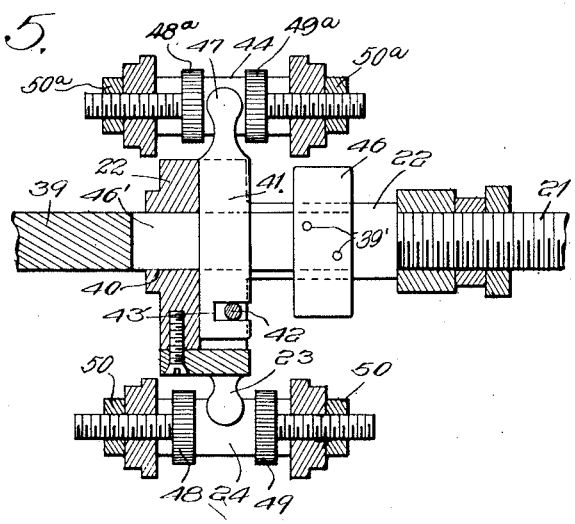

Jan. 9, 1934.  P. W. BEGGS  1,942,913
DIFFERENTIAL GOVERNOR
Filed Feb. 16, 1931    6 Sheets-Sheet 3
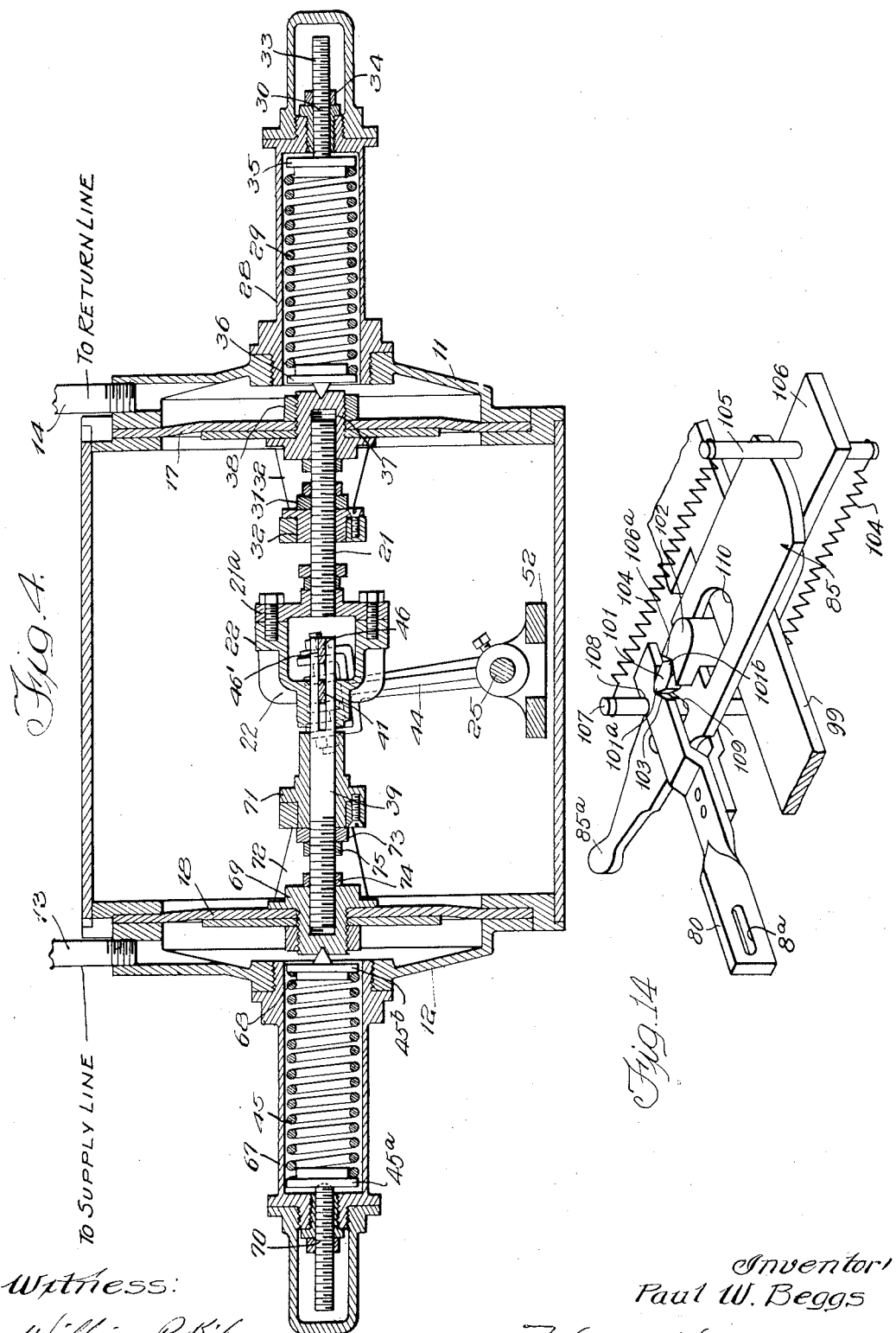
Witness:
William P. Kilroy
Inventor:
Paul W. Beggs
By Hill & Hill Attys.

Jan. 9, 1934.  P. W. BEGGS  1,942,913
DIFFERENTIAL GOVERNOR
Filed Feb. 16, 1931  6 Sheets-Sheet 4

Witness:
William P. Kilroy

Inventor:
Paul W. Beggs
By Hill & Hill
Attys

Jan. 9, 1934.    P. W. BEGGS    1,942,913
DIFFERENTIAL GOVERNOR
Filed Feb. 16, 1931    6 Sheets-Sheet 5

Witness:
William R. Kilroy

Inventor:
Paul W. Beggs
By Hill & Hill Attys

Jan. 9, 1934.          P. W. BEGGS                1,942,913
                    DIFFERENTIAL GOVERNOR
              Filed Feb. 16, 1931        6 Sheets-Sheet 6

Witness:                          Inventor.
William P. Kilroy                 Paul W. Beggs
                       By    Hill & Hill    Attys Patented Jan. 9, 1934

1,942,913

UNITED STATES PATENT OFFICE 1,942,913

DIFFERENTIAL GOVERNOR

Paul W. Beggs, Chicago, Ill., assignor, by mesne assignments, to Jas. P. Marsh Corporation, Chicago, Ill., a corporation of Illinois Application February 16, 1931. Serial No. 516,125

11 Claims. (Cl. 200—83)

This invention relates to controllers or governors, and particularly to devices of the character described which are adapted for connection with the supply and return lines of a system such, for example, as a heating system in which it is desired to maintain a pressure differential between the supply and the return sides of the system.

One object of the present invention is to provide a structure which is susceptible to pressure changes in the return side of the system, and which is capable of maintaining a desired range of pressure differential between the supply and return sides of the system.

Another object of the invention is to provide a device for actuating an electric switch mechanism for controlling the operation of a pressure producing mechanism when it is desired to maintain a pressure above atmospheric in the supply side of the system and a sub-atmospheric pressure in the return side of the system, or when the system is operating on a desired sub-atmospheric pressure differential in both sides of the system.

Another object of the invention is to provide a device of the character described having means associated therewith for varying the pressures at which the device may be operated.

Another object of the invention is to provide a structure whereby the range of pressure differential may be varied as desired for operating the device.

Another object of the invention is to provide a mechanism suitably connected to a pair of pressure responsive elements operatively related, respectively, to the supply and return lines of the system for actuating a switch to control the operation of the mechanism for producing and maintaining a pressure differential in the supply and return lines of the system.

A further object of the invention is to provide a structure wherein the pressure responsive element related to the return side of the system is operable independently of the pressure responsive element associated with the supply side, and wherein, when sub-atmospheric pressure prevails on both sides of the system, the pressure responsive means associated with the supply side operates in conjunction with the pressure responsive element of the return side to actuate the switch for controlling the operation of the pressure producing mechanism.

A still further object of the invention is to improve devices of the character described in sundry details hereinafter referred to and particularly pointed out in the appended claims.

Illustrative embodiments of the present invention are shown in the accompanying drawings in which Fig. 1 is a plan view of a structure embodying features of the present invention;

Fig. 3 is a transverse sectional elevational view taken substantially as indicated by the line 3—3 of Fig. 2;

Fig. 4 is a longitudinal sectional elevation of the structure illustrated in Figs. 1, 2 and 3 and taken substantially as indicated by the line 4—4 of Fig. 1;

Fig. 5 is an enlarged fragmentary sectional plan view of the structure forming a part of the connection between the pressure responsive elements and the switch operating mechanism;

Fig. 10 is an enlarged fragmentary longitudinal sectional elevation taken substantially as indicated by the line 10—10 of Fig. 6;

Fig. 11 is an enlarged fragmentary sectional elevational view taken substantially as indicated by the line 11—11 of Fig. 6;

Figure 6:
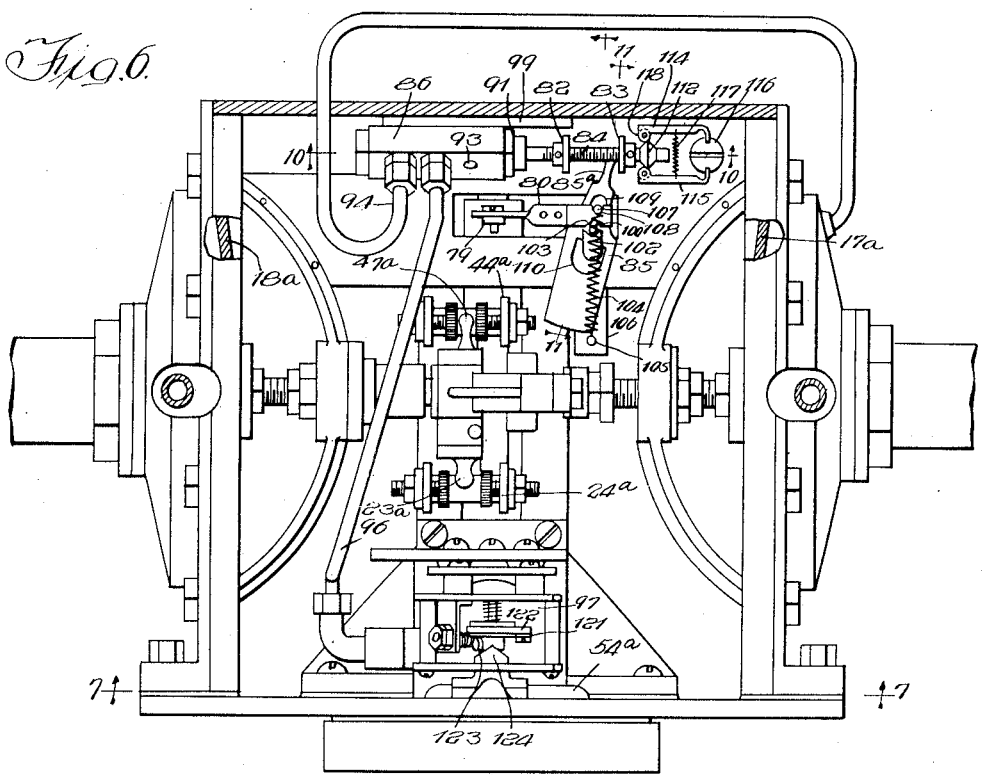
Fig. 6 is a plan view similar to Fig. 1 illustrating a modified construction of the switch operating mechanism which may be employed in place of the switch operating mechanism illustrated in Figs. 1, 2 and 3.
Figure 8:
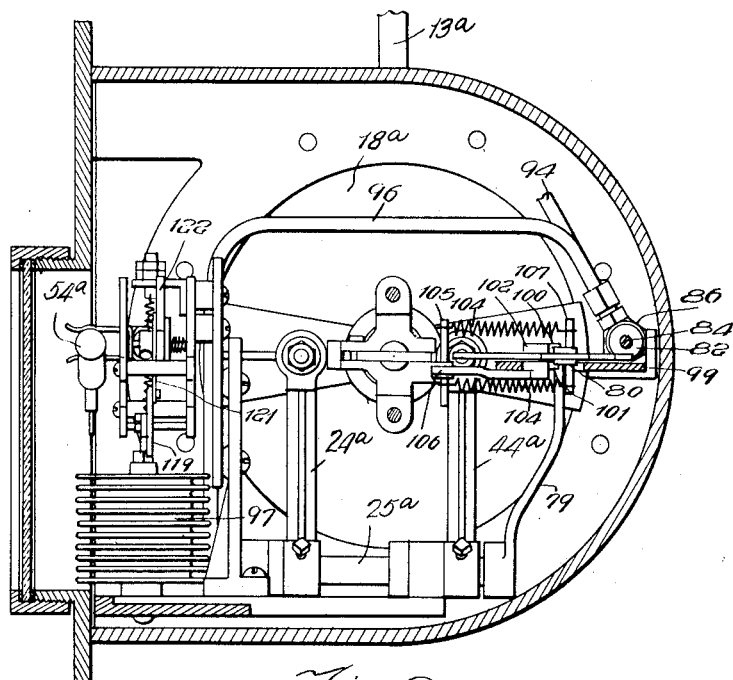
Fig. 8 is a transverse sectional elevation taken substantially as indicated by the line 8—8 of Fig. 6.
Figure 9:
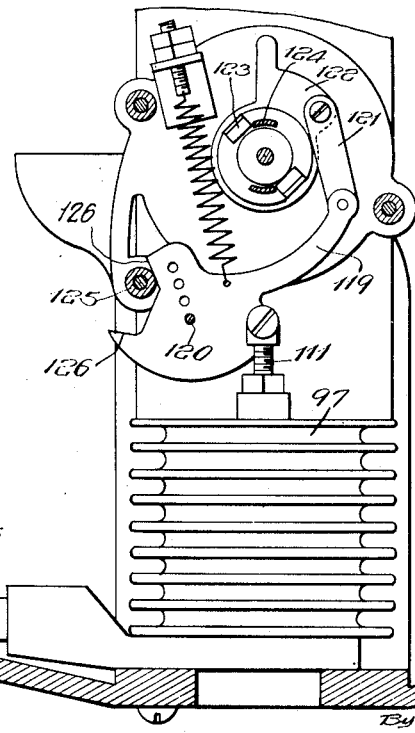
Fig. 9 is an enlarged fragmentary elevational view of a portion of the switch operating mechanism illustrated in Figs. 6, 7 and 8, the mechanism illustrated in Fig. 9 being shown in the "off" position of the switch.

Figs. 12 and 13 are enlarged perspective views of elements employed in the structure illustrated in Figs. 6, 8 and 11; and Fig. 14 is a detail perspective view illustrating the relationship of certain of the elements shown in Fig. 11 and the elements shown in Figs. 12 and 13.

For convenience, the present invention will be described in connection with its use in a heating system wherein a vacuum or sub-atmospheric pressure is maintained in the return side of the system, and wherein a pressure either above atmospheric or a sub-atmospheric pressure higher than that in the return side of the system, is maintained in the supply side thereof.

Referring to the drawings, the illustrative embodiment of the invention shown in Figs. 1 to 5, inclusive, comprises a supporting plate 10 on which are mounted open-sided housings 11 and 12, the housing 11 being adapted to communicate with the return side of the system through a pipe or conduit 14, and the housing 12 being adapted to communicate with the supply side of the system through a pipe 13.

For closing the open side of the housing 11, a pressure responsive element shown in the present instance as a flexible disc-like diaphragm 17 (Fig. 4) is mounted in the housing, and provided preferably adjacent its central portion with a threaded element 37 adapted to be secured to the diaphragm by means of a nut 38.

Mounted in the rigid wall of the housing 11 is a tubular member 28 adapted to receive a compression spring 29 in a manner to act between a pair of shouldered blocks 35 and 36, the latter being adapted to engage the threaded element 37 in a manner to normally urge the element 37 and central portion of the diaphragm 17 inwardly, while the block 35 may be adjusted longitudinally of the tubular member 28 by means of a screw 33 for varying the tension of the spring 29, the screw 33 being secured in adjusted position by means of a lock nut 34.

Formed integrally with the housing 11 is an inwardly extending arc-like supporting member 32 having a sleeve mounted therein and secured thereto in substantial axial alignment with the element 37 and spring 29, and slidably mounted in the sleeve is a screw-threaded member or rod 21 having one of its end portions adjustably mounted in the element 37 and provided with an adjustable stop nut 31 adapted for engagement with the sleeve mounted in the supporting member 32.

Adjustably mounted on the opposite end of the rod 21 is a plate 21a to which is rigidly secured a yoke 22 having an aperture 40 formed therein adjacent its central portion and in substantial alignment with the rod 21, and rigidly mounted on one side of the yoke 22 is a projection or stud 23 extending laterally therefrom.

Slidably mounted in the yoke 22 is one end of a member or rod 39 which is also slidably mounted, preferably adjacent its central portion, in a sleeve 71 carried by an arc-like supporting member 72 formed integrally with the housing 12, while the opposite or outer end of the rod 39 is adjustably connected to an element 69 secured, preferably, to the central portion of a pressure responsive element shown, in the present instance, as a disc-like flexible diaphragm 18 secured to the housing 12 in a manner to close the open side thereof, the rod 39 being secured in adjusted position with respect to the element 69 by means of a lock nut 74.

Mounted in the rigid wall of the housing 12 is a tubular member 67 adapted to receive a spring 45 operating between blocks 45a and 45b adjacent its opposite ends, the block 45b being adapted to engage the element 69 in a manner to normally urge the diaphragm 18, element 69 and rod 39 inwardly. The tension of the spring 45 may be varied as desired by suitable adjusting mechanism 70 mounted on the outer end of the tubular member 67 and operatively related to the outer end of the spring 45. For limiting the inward movement of the diaphragm 18 and member 69, the rod 39 is provided with an adjustable stop nut 73 adapted to engage the sleeve 71 and supporting member 72, and the stop nut may be secured in adjusted position by means of a lock nut 75.

For providing a slip connection, and for permitting relative movement of the rod 21 and the rod 39 by the movement of the diaphragm 17 when the heating system is being operated with a vacuum in the return side and a pressure above atmospheric in the supply side, the rod 39 is longitudinally slotted adjacent its inner end as indicated at 46', and suitably secured in said slot adjacent its open end, as by means of rivets 39', is a cross head 46, while loosely and slidably mounted in the slot 46', in spaced relation with respect to the head 46, is a bar 41 having a notch 43 formed therein adapted to receive a pin 42 mounted in the yoke 22, the outer end of the bar 41 having a contact portion 47 formed thereon and extending beyond the adjacent side of the yoke 22.

Operatively related to the stud 23 and portion 47 respectively in a manner to be moved thereby, are a pair of forked arms 24 and 44 adjustably and rigidly secured to a rock shaft 25 (Figs. 2, 3 and 4) mounted in bearings 53 formed on a bracket or support 52 rigidly secured to the face plate 10, thereby providing means for rocking the shaft 25 by movement of the stud 23 and portion 47.

For providing a suitable degree of relative movement between the forked end of the arm 24 and stud 23, the upper forked end of the arm 24 is provided with a pair of adjustable screw-heads 48 and 49 positioned on opposite sides of the stud 23 and adapted to be locked in adjusted position with respect to the arm 24 by means of lock nuts 50, while for providing a suitable degree of relative movement between the forked end of the arm 44 and the portion 47 of the bar 41, the upper forked end of the arm 44 is provided with a pair of adjustable screw-heads 48a and 49a positioned on opposite sides of the projection 47 and adapted to be secured in adjusted position with respect to the arm 44 by means of lock nuts 50a. It will be observed that by such an arrangement, the shaft 25 may be rocked in its bearing either by movement of the stud 23 or, under certain conditions hereinafter explained, by the portion 47 of the bar 41.

For operating an electric switch indicated as a whole by the numeral 15, a lever arm 26 is adjustably and rigidly secured to the shaft 25, and the switch, preferably, of the mercury type, includes a quick make and break or snap mechanism for moving the mercury tube 54 thereof to an "on" and "off" positions. The switch may be of any desired or suitable type, and in the present instance, is rotatably mounted upon a fixed support 51 formed on the bracket 52 rigidly connected to the face plate 10.

In the type of switch shown, the tube 54 is provided with a suitable amount of mercury for establishing an electrical connection between the terminals 55 and 56 of the switch. The tube 54 is carried by a bracket 57 which is rotatably mounted in a supporting plate 58 connected with a plate 59, the latter being secured to the fixed support 51. The bracket 57 in which the mercury tube is mounted is formed to provide cam portions 60 and 61, and a rotatable sliding element 63 is provided with rollers 62 adapted to cooperate with the cam portions 60 and 61 to cause quick rotation of the bracket 57 and the tube 54 carried thereby. The rotatable element 63 is provided with an arm 64 connected to one end of a link 27, the opposite end of which is connected with the lever arm 26 mounted on the rock shaft 25.

The rollers 62 of the rotatable element 63 are held in yieldable contacting relation with the cam portions 60 and 61 by means of a coil spring 65 mounted on a shaft 66 on which the element 63 is slidably and rotatably mounted. The mercury tube 54 and bracket 57, which is also rotatably supported by the shaft 66, are limited in their rotation with respect to the plate 58 in a manner to be held in "on" or "off" positions until the rotatable element 63 and rollers 62 carried thereby are moved with respect to the cam portions 60 and 61 by rotation of the element 63 through its connection with the rock shaft 25. The element 63 in its rotation is moved lengthwise of the shaft 66 until the rollers 62 ride over the high points of the cam portions 60 and 61, whereupon the spring 65 acting to move the element 63 toward the cams causes the rollers 62 to move to a low side of the cam so that a quick movement of the bracket 57 is obtained and the tube 54 is moved by a snap action to connect or disconnect the terminals 55 and 56 according to the direction of rotation of the rotatable element 63.

Figure 1:
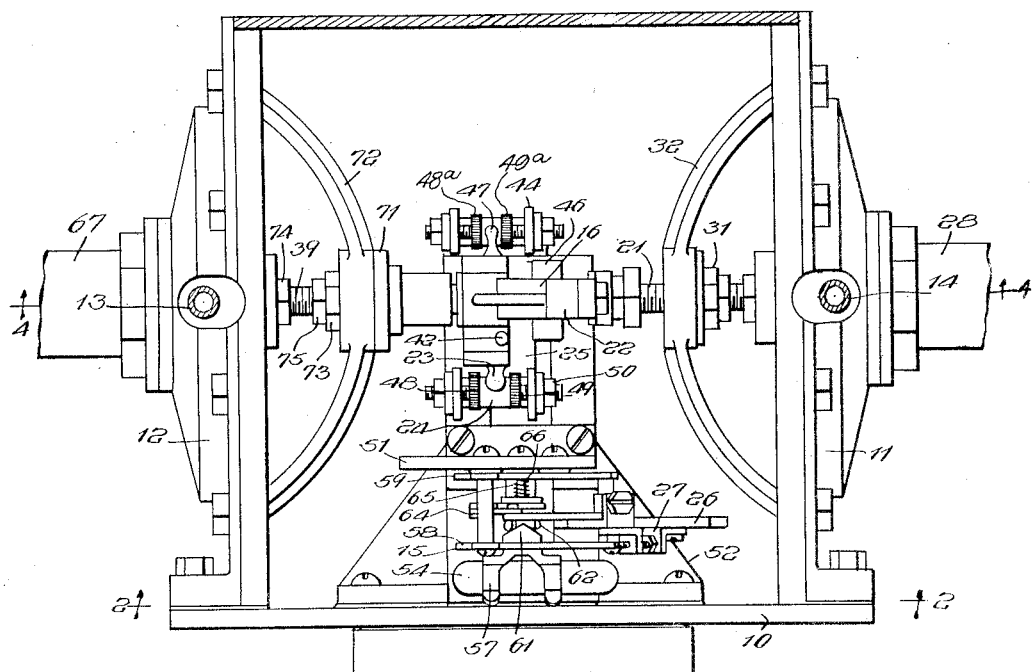
Figure 2:
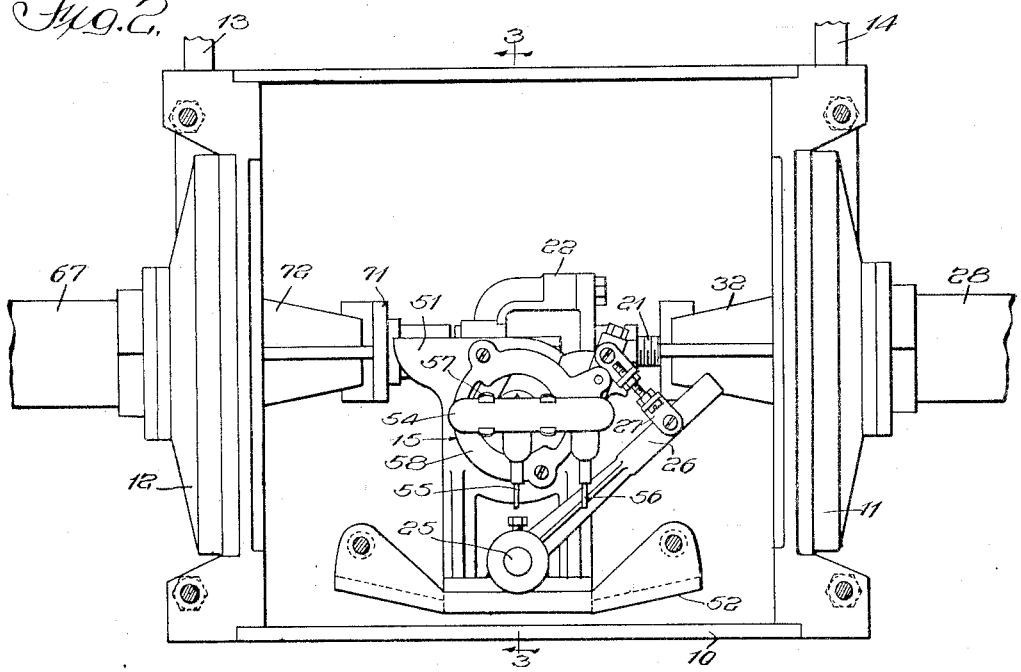
Fig. 2 is an elevational view of the structure illustrated in Fig. 1 and taken substantially as indicated by the line 2—2 thereof.

It will be observed that by such an arrangement, when the heating system is operating with a vacuum in the return side and a pressure above atmospheric in the supply side of the system, and a desired pressure differential exists in two sides of the system, the switch 15 will be in its off position, but when the vacuum in the return side of the system drops to a predetermined degree, according to the adjustment of the spring 29, the spring will act to move the diaphragm 17, rod 21 and stud 23 to the left (Figs. 1, 4 and 5), thereby rocking the shaft 25 in a counter-clockwise direction to position the mercury tube 54 of the switch 15 in its "on" position shown in Fig. 2 to connect the terminals 55 and 56 for operating a vacuum pump (not shown) to restore the required or desired degree of vacuum in the return side of the system, and when this degree of vacuum is obtained, the tension of the spring 29 will be overcome and the diaphragm 17, rod 21 and stud 23 will be moved to the right (Figs. 1, 4 and 5), to rotate the rock shaft 25 in a clockwise direction to position the mercury tube 54 in its "off" position and disconnect the terminals 55 and 56, thereby discontinuing the operation of the vacuum pump.

By reference to Fig. 5, it will be noted that although the screw heads 48 and 49 are spaced further from the stud 23 than the spacing of the screw heads 48a and 49a from the portion 47 of the bar 41, and that greater movement of the stud 23 is required to bring it into engagement with the heads 48 and 49 than the movement necessary to bring the portion 47 into engagement with the heads 48a and 49a, the loose connection of the bar 41 through the pin 42 and notch 43 with the yoke 22 on which the stud 23 is mounted, permits the bar 41 to slide with respect to, or oscillated about the pin 42 without exerting any force against the heads 48a and 49a, thereby adapting itself to the movement of the yoke 22 and stud 23 when the switch mechanism is operated through the medium of the stud 23 and arm 24.

When it is desired to operate the heating system with a vacuum in both the supply and return lines of the system, and, under such conditions, by maintaining a suitable sub-atmospheric pressure differential in the two sides of the system, it will be noted that the vacuum in the return side will act normally to move the diaphragm 17, rod 21 and yoke 22 toward the right (Figs. 4 and 5), while the vacuum in the supply side will serve to move the diaphragm 18, rod 29 and head 46 toward the left (Figs. 4 and 5), thereby causing the head 46 to engage the adjacent face of the bar 41 and clamp the bar securely between the head 46 and the yoke 22, the vacuum in both the supply and return sides of the system acting to maintain the head 46 and yoke 22 in relatively fixed interlocked position with the bar 41 clamped therebetween.

Under these conditions, and with the parts in their relative positions just described, any drop in vacuum in the return line below the predetermined differential will permit the spring 29 and the vacuum in the supply side of the system to move the rods 21 and 39, head 46, yoke 22, bar 41 and its portion 47 as a unit toward the left (Figs. 4 and 5) thereby causing the arm 44 to rock the shaft 25 in a counter-clockwise direction (Fig. 4), and through the connection of the lever arm 26 with the switch mechanism previously described will actuate the switch mechanism to connect the terminals 55 and 56 and start the pump for restoring the required degree of vacuum within the return line of the system, and after the desired degree of vacuum has been obtained therein and sufficient to overcome the action of the spring 29 and vacuum obtaining in the supply side of the system, the interlocked associated parts including the portion 47 of the bar 41 will be moved in the opposite direction to the right to move the switch to its off position, thereby discontinuing the operation of the vacuum pump. It will be noted by reference to Fig. 5 that owing to the greater distance between the screw-heads 48 and 49 of the arm 24, that when the switch mechanism is operated through the medium of the portion 47 of the bar 41 as just described, there will be no engagement of the stud 23 with the heads 48 and 49 as when the heating system is operating with a pressure above atmospheric in the supply side of the system, as previously described.

It will be observed from the foregoing description that the present invention provides a novel structure and arrangement whereby a desirable pressure differential may be maintained in the supply and return sides of a heating system, or the like, and that through the various adjustments provided, the differential may be varied as desired.

Furthermore, it will be observed that the character of the present invention permits the system to be opeated with a vacuum or sub-atmospheric pressure on the return side and a pressure above atmospheric on the supply side, or may be operated with vacuums or sub-atmospheric pressures of the desired differential existing in both the return and supply sides of the system.

Referring now particularly to Figs. 6 to 14, inclusive, wherein is disclosed a modified form of a portion of the switch actuating mechanism, it will be observed that between the supply side and the return side of the system, the structure is identical with that shown in Figs. 1 to 5, inclusive, up to and including the rock shaft 25. These like parts disclosed in Figs. 7 and 8 include the diaphragms 17a and 18a, stud 23a operatively related to the arm 24a and a portion 47a operatively related to the arms 44a, said arms being adjustably secured to a shaft 25a after the manner of the arms 24 and 44 of Figs. 1 to 4, inclusive.

Figure 7:
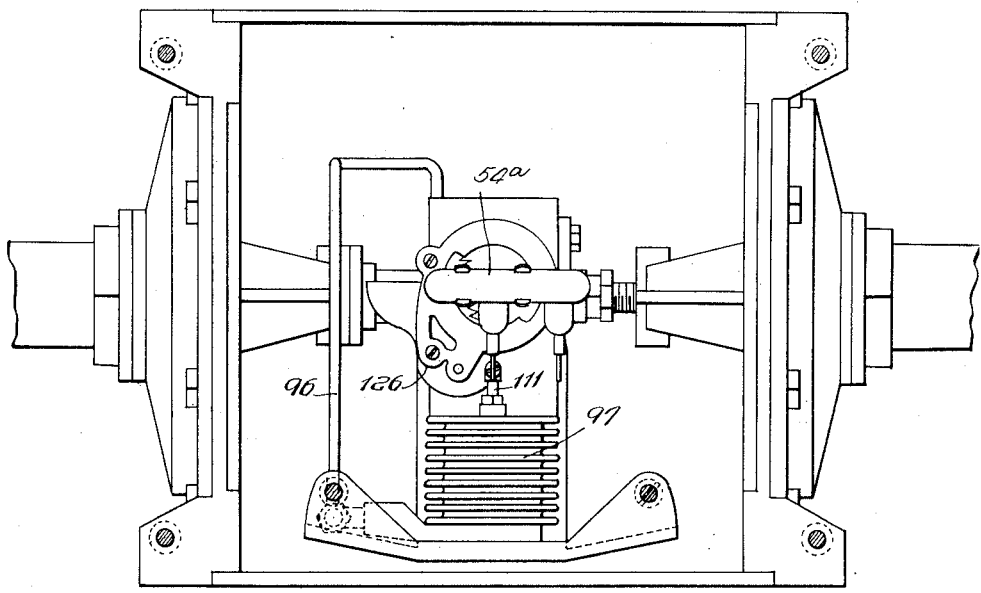
Fig. 7 is an elevational view of the structure illustrated in Fig. 6 taken substantially as indicated by the line 7—7 thereof, and showing the mercury tube of the switch in its "on" position.

Referring to Figs. 6 to 8, it will be observed that the shaft 25a is provided adjacent one of its ends with an arm 79 extending upwardly through an opening formed in a frame member 99, and is pivotally and loosely connected at its upper end, by means of a pin and slot 80a, to one end of a link 80, the opposite end of which is forked as illustrated in Figs. 13 and 14 in a manner to straddle an arm 85 as illustrated in Figs. 11 and 14.

The arm 85 shown in perspective in Fig. 12 is provided with a reduced end portion 85a and with apertures 109 and 110 formed therein, and also with vertical lugs 100 and 101 extending on opposite sides of the arm, the lug 100 having knife-like edges 100a and 100b on opposite sides thereof positioned substantially in the vertical longitudinal plane of the arm 85, while the lug 101 is provided with knife-like edges 101a and 101b also in substantially the vertical longitudinal plane with the arm 85. The knife-like edges 100a and 101a are adapted to engage V-shaped notches 103 formed in one side of the forked end of the link 80, and the knife-like edges 100b and 101b are adapted to engage V-shaped notches 106a formed in a bracket 106 rigidly secured to the frame member 99, a portion 102 of the bracket 106 extending upwardly through the aperture 110 formed in the arm 85 and having a V-shaped notch similar to 106a for receiving the knife-like edge 101b of the lug 101. For retaining the forked end of the link 80 and the lugs 100 and 101 in operative relationship with the notched brackets 106, a pin 107 extends through the aperture 109 of the arm 85 and is positioned in U-shaped notches 108 formed in one side of the forked ends of the link 80 opposite the notches 103, as shown in Figs. 13 and 14, and secured to the projecting ends of the pin 107 are springs 104 connected at their opposite ends to a pin 105 mounted in and extending on opposite sides of the bracket 106. It will be observed that by such an arrangement, any longitudinal movement of the link 80 which will carry the pin 107 to one or the other side of a longitudinal line extending through the pin 105 and the pivotal connection of the knife-like edges 100b and 101b with the notches 106a, will impart a quick snap action to the arm 85 which will be permitted by the slotted connection between the link 80 and the arm 79.

For actuating the mercury switch tube 54a, a valve housing or casing 86 is rigidly mounted on the frame of the device, and is provided on its interior with chambers 92 and 95, and slidably mounted in an apertured plug 91 at one end of the housing is a rod or valve stem 84 having a valve 90 formed thereon adapted to cooperate with a valve seat 88 formed in the housing, and adjustably connected to the inner end of the rod 84 is a valve 89 adapted to engage a valve seat 87 formed also in the valve housing 86. On a portion of the rod 84 outside the housing 86 are a pair of spaced collars 82 and 83 positioned on opposite sides of the reduced end portion 85a of the arm 85 in a manner to be engaged thereby when the arm is rocked in one direction or another by reason of its connection with the arm 79. For yieldably retaining the rod 84 in position after being moved longitudinally in one direction or another by the portion 85a of the arm 85, the rod is provided adjacent its outer end with a double-faced cam member 112 adapted to be engaged by rollers 118 mounted in the free ends of the arms 114 and 115, the opposite end of the arms being pivotally connected to a post 116, and yieldably connected together intermediate their ends by a spring 117 adapted to normally urge the rollers 118 toward the cam member 112.

Communicating with the chamber 95 at one side of the valve seat 87 is one end of a conduit 94 operatively connected at its opposite end to the diaphragm chamber associated with the return side of the heating system as illustrated in Fig. 6, and communicating with the interior of the valve housing at the opposite side of the valve seat 87 is one end of a conduit 96 having its opposite end communicating with the interior of a bellows-type diaphragm 97. Adjustably mounted on the upper end of the bellows 97 is a link 111 pivotally connected at its upper end to an arm 119 mounted to oscillate about a pivot pin 120, and to the free end of the arm 119 is connected one end of a link 121, the opposite end of which is pivotally connected to a rotatable member 122 carrying rollers 123 adapted to engage the oppositely inclined cam faces formed on the portion 124 in which the mercury tube 54a is mounted, the action of the rotatable member 22 and rollers 123 on the cam portion 124 being substantially like that described with reference to the member 63, rollers 62 and cam portions 60 and 61 shown in connection with the structure disclosed in Figs. 1 to 5, inclusive.

For limiting the movement of the oscillating arm 119, a stop 125 is rigidly secured to the frame and adapted to be engaged by the portions 126 respectively of the arm 119 when the latter is moved in opposite directions.

It will be observed from the foregoing description that while the desired vacuum is maintained in the return side of the system, the electric switch will remain in open position, but when the vacuum in the return side reaches a predetermined low point, the diaphragm 17a will be moved to the left (Fig. 6) and through either the stud 23a or portion 47a, the shaft 25a will be rocked and the upper end of the arm 79 and the link 80 will be moved to the left causing the portion 85a of the arm 85 to engage the collar 82 on the valve rod 84 to move the rod also to the left (Figs. 6 and 10) in a manner to seat the valve 90 and unseat the valve 89, thereby establishing communication between the conduit 94 communicating with the housing of the diaphragm 17a and the conduit 96 communicating with the bellows diaphragm 97, under which condition, the vacuum still remaining in the return side of the system will act to collapse the bellows 97 and draw the free end of the arm 119 downwardly, thereby rotating the member 122, and through the cooperation of the rollers 123 with the cam surfaces on the portion 124 to cause the switch to be moved to and retained in its closed or "on" position until such time as a predetermined high vacuum has been created in the return side of the system, at which time, the diaphragm 17a will be moved to the right (Fig. 6) thereby causing the upper end of the arm 79 and link 80 to be moved to the right and the arm 85 to the position shown in Fig. 6, whereupon the portion 85a will again engage the collar 83 to move the valve rod 84 to the right (Figs. 6 and 10), thereby seating the valve 89 and opening the valve 90 to establish communication between the conduit 96 connected with the bellows diaphragm 97 and the atmosphere through the chamber 92 and port 93 formed in the valve housing 86, thus permitting atmospheric pressure to enter the bellows 97 to raise the free end of the arm 119 and return the switch to its "off" position.

It will be observed also that by use of the switch operating mechanism illustrated in Figs. 6 to 14, inclusive, the switch may be moved to its "on" and "off" positions by the vacuum in the return side of the system, and that by such an arrangement, as is the case in the structure disclosed in Figs. 1 to 5, inclusive, a desired degree of vacuum or sub-atmospheric pressure may be maintained in the return side of the system, and a suitable pressure differential may be maintained between the two sides of the system whether a pressure above atmospheric or a vacuum is maintained in the supply side thereof.

Obviously, the present invention is not limited to the precise construction and arrangement shown and described as the same may be variously modified. Moreover, all the features of the invention need not be used conjointly as the same may be used to advantage in variously different combinations and subcombinations.

What I claim as new and desire to cover by Letters Patent is:

1. In a switch operating mechanism adapted for connection to a plurality of pressure responsive elements, the combination of relatively movable members connected respectively to said elements, and means carried by one of said members and operatively related to a switch for moving the latter to "on" and "off" positions when said one of the members and the pressure responsive elements connected thereto are moved as a unit in opposite directions, said members having cooperable means associated therewith and being adapted to be held in relatively fixed position with respect to each other by the action of said elements.

2. In a switch operating mechanism adapted for connection to a plurality of pressure responsive elements, the combination of relatively movable members connected respectively to said elements, means carried by one of said members and operatively related to a switch for moving the latter to "on" and "off" positions, and means rigidly connected to another of said members and operatively related to said one of the members for retaining the members in relatively fixed position when the said elements are urged in opposite directions and for causing said members to move in unison to actuate the switch when said members are moved in the same direction.

3. In a switch operating mechanism adapted for connection to a pair of pressure responsive elements, the combination of a pair of relatively movable members connected respectively to said elements, means carried by one of said members and operatively related to a switch for moving the latter to "on" and "off" positions when said one of the members and the pressure responsive element connected thereto are moved as a unit in opposite directions, a contact portion loosely mounted on said one of the members and adapted to be operatively related to said switch for moving the switch to "on" and "off" positions, means rigidly connected to the other of said members and operatively related to said one of the members and to said contact portion for securing said portion rigidly with respect to said members when the said elements and their respective members are urged in opposite directions, thereby causing said members, pressure responsive elements and contact portion to move in unison to actuate the switch when said elements are moved in the same direction or as a unit in opposite directions.

4. In a switch operating mechanism adapted for connection to a plurality of pressure responsive elements, the combination of relatively movable members adjustably connected respectively to said elements, a stud rigidly secured to and a contact portion loosely mounted on one of said members and operatively related to a switch for moving the latter to "on" and "off" positions when said members and the pressure responsive elements connected thereto are moved as a unit in opposite directions, said members having cooperable means associated therewith adapted to engage said contact portion to secure it in fixed position with respect to said members by the action of said elements.

5. In a switch operating mechanism adapted for connection to a plurality of pressure responsive elements, the combination of a pair of relatively movable members adjustably connected respectively to said elements, a stud carried by one of said members and adjustably related to a switch for moving the latter to "on" and "off" positions, and a head rigidly connected to the other of said members and operatively related to said one of the members for retaining the members in relatively fixed position when the said elements are urged in opposite directions and for causing said members to move in unison to actuate the switch when said members are moved as a unit in opposite directions.

6. In a switch operating mechanism adapted for connection to a pair of pressure responsive elements, the combination of a pair of relatively movable members adjustably connected respectively to said elements, a stud rigidly mounted on one of said members and adjustably related to a switch for moving the latter to "on" and "off" positions when said one of the members and the pressure responsive elements connected thereto are moved as a unit in opposite directions, a contact portion loosely mounted on said one of the members and adapted to be operatively related to said switch for moving the switch to "on" and "off" positions, means rigidly connected to the other of said members and cooperatively related to said one of the members and to said contact portion for securing said portion rigidly with respect to said members when the said elements and their respective members are urged in opposite directions, thereby causing said members, pressure responsive elements and contact portion to move in unison to actuate the switch by means of said contact portion when said elements are moved as a unit in opposite directions.

7. In a switch actuating mechanism adapted for connection to a pair of pressure responsive elements, the combination of a pair of relatively movable members adjustably connected respectively to said elements, a rock shaft, a pair of forked arms rigidly connected to said shaft, a stud mounted on one of said members and operatively related to the forked end of one of said arms, a contact portion loosely mounted on said one of the members and operatively related to the forked end of the other of said arms, means carried by the respective members and operatively related to said contact portion for clamping the portion in fixed position with respect to said members, and means mounted on said rock shaft and operatively related to a switch for actuating the switch when said shaft is rotated in opposite directions by the movements of said pressure responsive elements and their respective members.

8. In a switch operating mechanism adapted for connection to a pair of pressure responsive elements, the combination of a rod adjustably connected at one of its ends to one of said elements, a yoke adjustably connected to the opposite end of said rod, a rock shaft, a pair of forked arms adjustably connected to said shaft, a stud mounted on said yoke and adjustably related to the forked end of one of said arms, a contact portion loosely mounted on said yoke and adjustably related to the forked end of the other of said arms, a second rod adjustably connected at one of its ends to the other of said pressure responsive elements and having its opposite end slidably mounted in said yoke, a head rigidly connected to the last mentioned end of said second rod and cooperable with said yoke for clamping said contact portion therebetween and in fixed relation with respect to said rods, and means adjustably mounted on said shaft and operatively related to a switch for actuating the switch when said shaft is rotated in opposite directions by the movements of said pressure responsive elements and their respective rods.

9. In a switch operating mechanism adapted for connection to a pair of pressure responsive elements, the combination of a rod adjustably connected at one of its ends to one of said elements, a yoke having an aperture formed therein adjustably connected to the opposite end of said rod, a rock shaft, a pair of forked arms adjustably connected to said shaft, a stud mounted on said yoke and adjustably related to the forked end of one of said arms, a second rod adjustably connected at one of its ends to the other of said pressure responsive elements and having its opposite end longitudinally slotted and slidably mounted in the aperture formed in said yoke, a contact portion positioned in said slot and loosely connected to said yoke, said portion being adjustably related to the forked end of the other of said arms, a head rigidly mounted in the slotted end of said second rod normally in spaced relation with respect to said contact element and cooperable with said yoke for clamping said contact portion therebetween and in fixed relation with respect to said rods, and a third arm adjustably mounted on said shaft and operatively related to a switch for actuating the switch when said shaft is rotated in opposite directions by movements of said pressure responsive elements and their respective rods.

10. In a switch operating mechanism adapted for connection to a pair of pressure responsive diaphragms operatively related respectively to the supply and return sides of a heating system, the combination of a rod adjustably connected at one of its ends to the return side diaphragm, a yoke having an aperture formed therein adjustably connected to the opposite end of said rod, a rock shaft, a pair of forked arms adjustably connected to said shaft, screw-heads adjustably mounted in the forked ends of said arms, a stud mounted on said yoke and positioned between the screw-heads in the forked end of one of said arms, a second rod adjustably connected at one of its ends to the supply side diaphragm and having its opposite end longitudinally slotted and slidably mounted in the aperture formed in said yoke, a contact portion movable in said slot and loosely connected to said yoke, said portion extending outwardly from said yoke and having its outer end positioned between the screw-heads in the forked end of the other of said arms, a head rigidly secured in the slotted end of said second rod normally in spaced relation with respect to said contact element and on the opposite side thereof from said yoke, said head being cooperable with said yoke for clamping said contact portion therebetween in fixed relation with respect to said yoke and rods to provide substantially a unitary structure when said diaphragms are moved respectively in opposite directions, and a third arm adjustably mounted on said rock shaft and operatively related to a switch for actuating the switch when said shaft is rotated in opposite directions either by the independent movements of said return side diaphragm or the movements of said diaphragms, their respective rods and associated parts as a unitary structure.

11. In a switch operating mechanism adapted for connection to a pair of pressure responsive diaphragms having housings communicating respectively with the supply and return sides of a heating system, the combination of a rod adjustably connected at one of its ends to the return side diaphragm, a yoke having an aperture formed therein adjustably connected to the opposite end of said rod, a rock shaft, a pair of forked arms adjustably connected to said shaft, screw-heads adjustably mounted in the forked ends of said arms, a stud mounted on said yoke and positioned between the screw-heads in the forked end of one of said arms, a second rod adjustably connected at one of its ends to the supply side diaphragm and having its opposite end longitudinally slotted and slidably mounted in the aperture formed in said yoke, a contact portion positioned in said slot and loosely connected to said yoke, said portion extending outwardly therefrom and being positioned between the screw-heads in the forked end of the other of said arms, a head rigidly secured in the slotted end of said second rod normally in spaced relation with respect to said contact element and on the opposite side thereof from said yoke, said head being cooperable with said yoke for clamping said contact portion therebetween in fixed relation with respect to said yoke and rods to provide substantially a unitary structure when said diaphragms are moved respectively in opposite directions, a valve housing, a plurality of valves therein, a third diaphragm operatively related to a switch, a conduit communicating with said valve housing and with the housing of said return side diaphragm, a second conduit communicating with said valve housing and said third diaphragm, a third arm adjustably mounted on said rock shaft and operatively related to said valves for actuating the valves to control the operation of said third diaphragm and said switch.

PAUL W. BEGGS.